United States Patent [19]
Brady

[11] Patent Number: 5,982,857
[45] Date of Patent: *Nov. 9, 1999

[54] VOICE RECORDING METHOD AND SYSTEM PROVIDING CONTEXT SPECIFIC STORAGE AND RETRIEVAL

[75] Inventor: Patrick K. Brady, Wheaton, Ill.

[73] Assignee: Apropros Technology, Oakbrook Terrace, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/546,900

[22] Filed: Oct. 23, 1995

Related U.S. Application Data

[63] Continuation of application No. 08/324,249, Oct. 17, 1994, abandoned.

[51] Int. Cl.[6] .................................................. H04M 3/42
[52] U.S. Cl. ...................... 379/88.19; 379/265; 379/8.27
[58] Field of Search .................................. 379/84, 85, 88, 379/89, 67, 34, 35, 265, 266, 88.17, 88.13, 88.19, 88.2, 88.27

[56] References Cited

U.S. PATENT DOCUMENTS

| | | | |
|---|---|---|---|
| 5,003,574 | 3/1991 | Denq et al. .................................. | 379/84 |
| 5,008,930 | 4/1991 | Gawrys et al. ........................... | 379/212 |
| 5,210,789 | 5/1993 | Jeffus et al. .............................. | 379/223 |
| 5,241,586 | 8/1993 | Wilson et al. ............................. | 379/89 |
| 5,309,505 | 5/1994 | Szlam et al. .............................. | 379/214 |
| 5,392,329 | 2/1995 | Adams et al. ............................. | 379/84 |
| 5,467,391 | 11/1995 | Donaghue, Jr. et al. ................ | 379/265 |
| 5,533,103 | 7/1996 | Peavey et al. ............................. | 379/85 |
| 5,535,256 | 7/1996 | Maloney et al. .......................... | 379/34 |

FOREIGN PATENT DOCUMENTS

| | | | |
|---|---|---|---|
| 2257872 | 1/1993 | United Kingdom ...................... | 379/34 |

OTHER PUBLICATIONS

"Cal Center Product Roundup.", Telecommuting Review: the Gordon REport, v8, n9, p. 6, Sep. 1991.

McNamara, "Quality Must be seen and Heard," Inbound/Outbound Magazine, pp. 66–67, Dec. 1989.

Bob McNinch, Screen–Based Telephony, Apr. 1990, pp. 34–38.

*Primary Examiner*—Daniel S. Hunter
*Attorney, Agent, or Firm*—Crowell & Moring LLP

[57] ABSTRACT

A system and method for voice recording comprising one or more peripheral devices attached to a computer or a group of networked computers each having the peripheral device, wherein the peripheral device is capable of performing telephony functions such as dialing, answering, etc. and is also capable of recording and playing back telephone calls. It can record the calls at a location on a computer hard disk. The voice recording system provides software control of the board providing the advantages of selective recording of individual phone calls, storage of phone calls along with information about the calls, and retrieval of any single recorded call based on search criteria provided by an operator of one of the computers.

6 Claims, 10 Drawing Sheets

VOICE RECORDING METHOD AND SYSTEM PROVIDING CONTEXT SPECIFIC STORAGE AND RETRIEVAL

This is a continuation of application Ser. No. 08/324,249 filed Oct. 17, 1994, abandoned.

FIELD OF INVENTION

This invention relates to transaction voice recording systems. In particular, this invention relates to voice recording systems used with call distribution telephone systems.

BACKGROUND

Transaction voice recording systems are used to record telephone conversations between an agent and a customer. Such recordings can then be used for training and for error detection. For example, by listening to a number of recorded conversations between experienced agents and customers, a new agent can quickly learn the vocabulary used in the kinds of telephone conversations the agent will be making. The agent can also quickly learn what kinds of situations he or she will encounter, and how experienced agents cope with difficult situations.

With respect to error detection, a recorded telephone call serves as a record that can be used to verify whether an error occurred. This is particularly useful in the case of banking by wire transfer. All calls where a customer requests a wire transfer can be recorded. If the bank is later accused of making a mistake, the bank will have a record of exactly what it was instructed to do by the customer.

One problem with existing voice recording systems is that retrieving a particular message or a group of messages relating to a particular topic is very difficult. The reason for this is that all calls are recorded together and stored in one place, for example on one multitrack tape. In order to retrieve a call, a track must be identified and listened to, which is very time consuming and expensive. Identifying a track may require knowing the handling agent as well as the seat location of that agent on the particular day of the transaction. Because of these retrieval difficulties only those transactions which are of the highest cost of error are generally retrieved. The ability to instantly and easily retrieve recorded transactions will greatly expand the usefulness and marketability of transaction voice recording.

Another problem of existing voice recording systems is that it is very difficult to make changes to an existing configuration. Each implementation of a voice recording system will have its own specific requirements that relate to the business that the implementation will be used for. Applicant has discovered that it is very desirable to have a flexible voice recording system that can be easily changed to fit the needs of its users.

SUMMARY OF INVENTION

Applicant has discovered that by putting the control of a voice recording device in a workstation or in an application program running on a multi-user computer tremendous advantages can be achieved in flexibility and in the ability to make inexpensive changes to existing implementations of a voice recording system once it is in place. Furthermore, applicant has discovered that this invention provides a simple and inexpensive way of recording each telephone conversation individually, and storing it in a way that allows for easy and sophisticated retrieval based on any criteria desired by a user.

In one embodiment of the invention, the voice recording system is implemented on a number of workstations linked together on a network. A number of these workstations are operated by agents who answer and place telephone calls to customers. The calls are made and answered using the workstation itself, which has as a peripheral device a board that provides telephony functions. The board also provides for recording a telephone call on the disk drive of the workstation itself. The board includes driver software that allows a process running on the workstation to control the board to begin recording, to end recording, and to store the recorded call at a desired location on the workstation's disk drive. The process running on the workstation is, in this embodiment, a running computer program. Because this process is in software, it is easily modified to trigger beginning and ending of recording on any number of criteria or to store the file containing the recorded phone call along with any other information that would be useful in retrieving the call later. Furthermore, because it is a process in a workstation environment, it is capable of communicating with other processes running on the workstation and can communicate via the LAN with other processes running on any of the other computers on the LAN. Thus, it potentially has available many different types of information. This information can, for example, be used to trigger recording in very specific instances and can be used to construct very sophisticated data bases of recorded conversations that can be easily searched for particular calls on particular subjects.

In another embodiment of the voice recording system of this invention, the system is implemented on a multi-user computer. Each agent has a terminal and a voice receiver and transmitter, and the multi-user computer has a number of peripheral devices for controlling the recording of each call. Once again, the peripheral devices are provided with driver software to allow them to be controlled by one or more processes running on the multi-user computer. These one or more processes are running versions of one or more computer programs. As such, they are easily modifiable and can provide all the functionality necessary for a wide variety of implementations. Furthermore, these processes can communicate with other processes running on the multi-user computer and therefore have all of the advantages pointed out above.

DETAILED DESCRIPTION OF THE INVENTION

Figure 1:
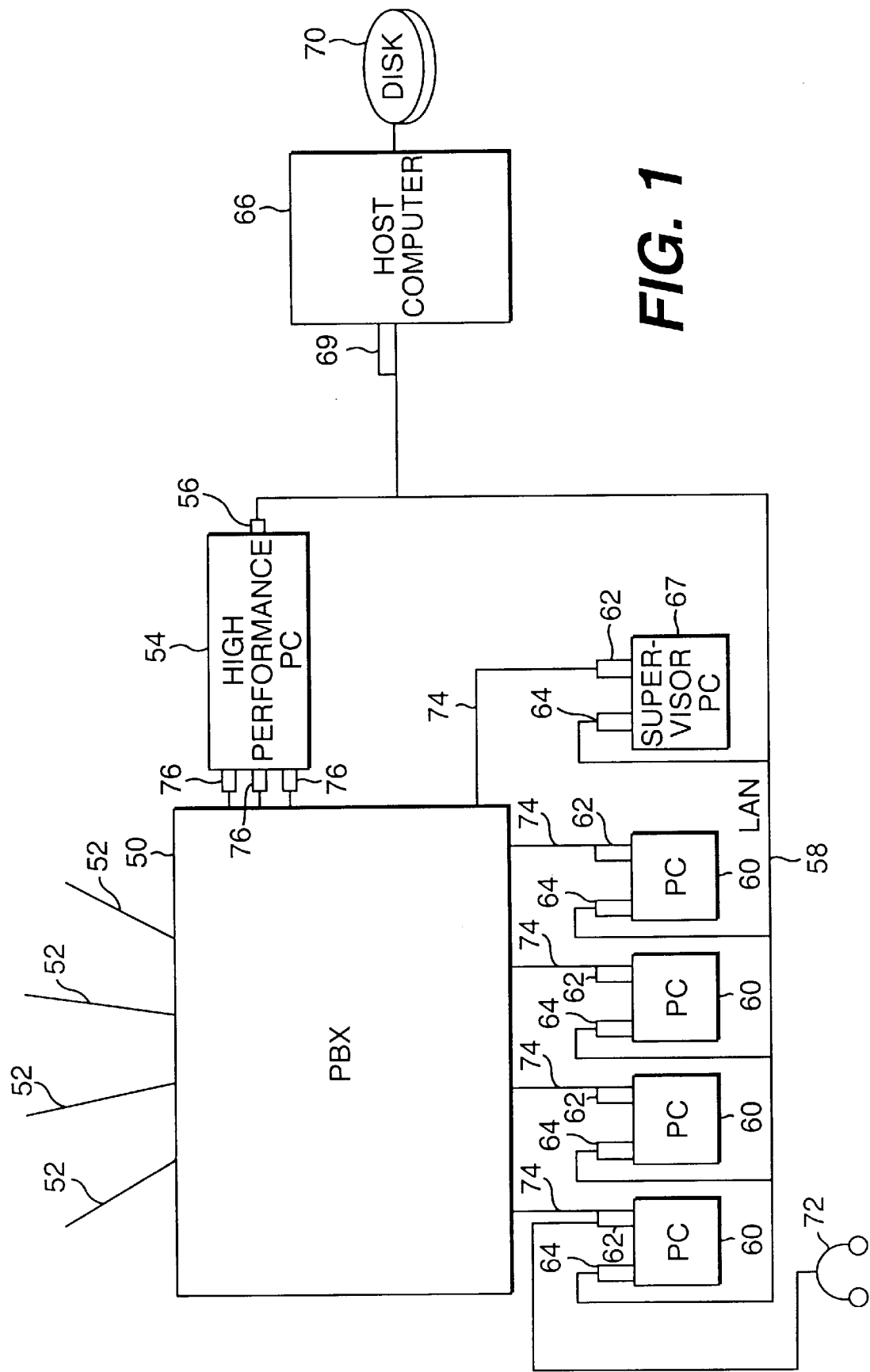
FIG. 1 shows a schematic of a first embodiment of the invention.

In one embodiment of the voice recording system of this invention, the invention is implemented on a distributed call distributor such as is disclosed in applicant's copending application Ser. No. 07/904,196, U.S. Pat. No. 5,557,668, filed Jun. 25, 1992, which is herein incorporated by reference. Such a distributed environment is shown in FIG. 1.

In this embodiment a PBX 50 serving one or more telephone lines 52 is connected to multiple telephony boards 62 and 76. The boards 62 can be the VBX 100 boards provided by Natural Micro Systems. The Board 76 can be a VBX 400 board provided by the same company. These boards include driver software. The telephony boards 62 and 76 are plugged into a main board of IBM compatible personal computers 60 and 54. Of course, in other embodiments, other types of computers can be used. The PCs 60 and 54 also include networking boards 56 and 64 which connect the PC 60 and 54 to a local area network (LAN) 58. Each of the PCs 60 includes a headset 72, including a voice receiver and voice transmitter, although only one headset is shown in FIG. 1. Also connected to the LAN via another network card 69 is a computer 66 having a large storage disk 70. The computer 66 can thus contain large databases or other information useful for controlling and recording and retrieval of telephone conversations.

Figure 2:
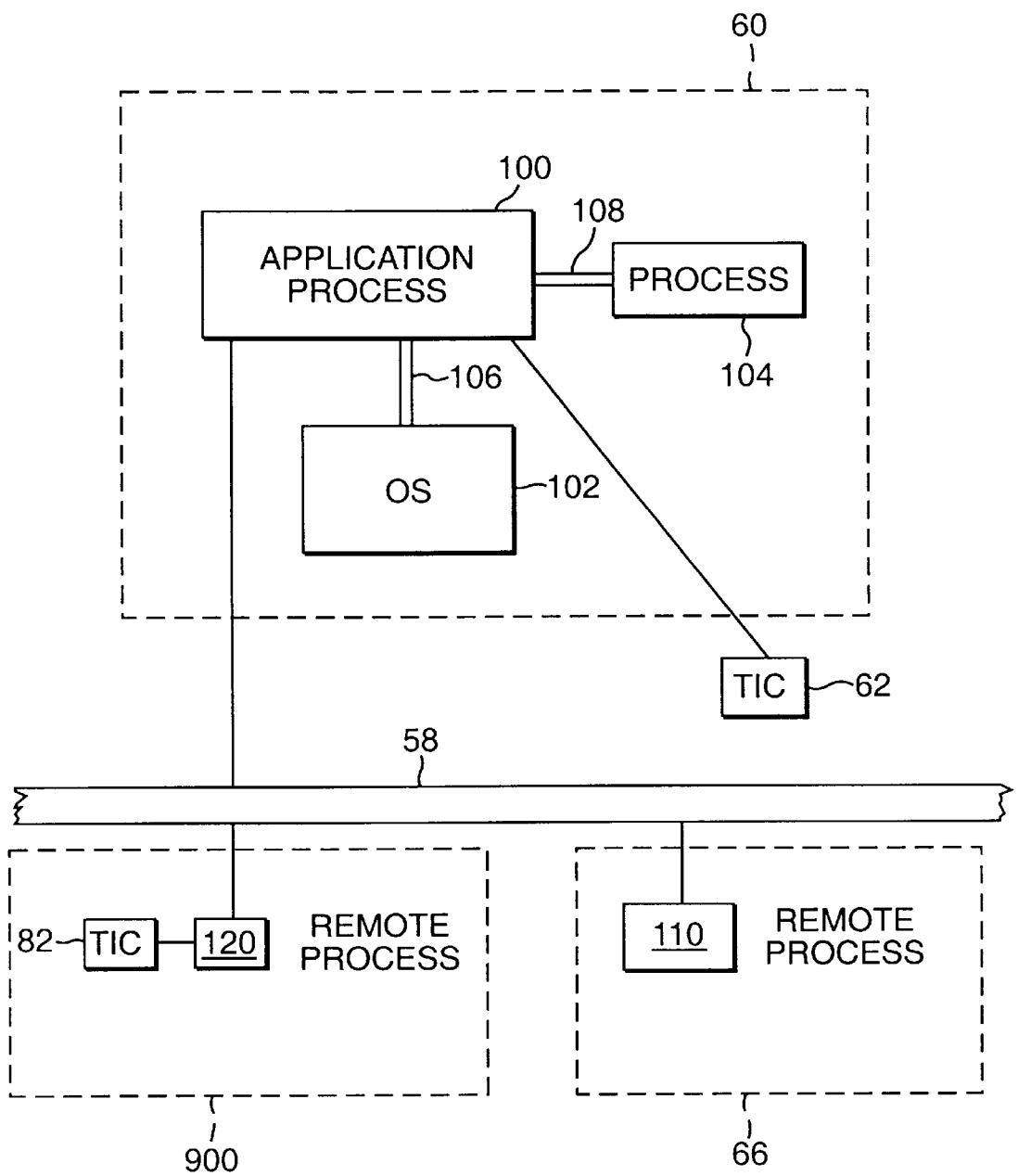
FIG. 2 shows a schematic of the software architecture inside a workstation used in a first embodiment of the invention.

FIG. 2 shows a schematic of the software running on a PC 60 that is used to implement the present invention. The application process 100 is an executed instance of an application program. The agent uses the application process to answer calls and terminate calls. The application process also controls the board 62 to begin recording, end recording, begin playing back messages, end playing back messages, as well as to control the board 62 to perform the various telephony functions such as dial, off hook, on hook etc. The application process 100 can control the board 62 to perform any of these functions in response to a direct request by the agent input by a mouse click or key strokes on the keyboard of PC 60, or the application process 100 can automatically perform these functions based on its own internal logic and in response to input from a remote process across the LAN 58 or the operating system 102 or from another process 104 running on the computer 60. The communication links 106 and 108 that connect the application process 100 to the operating system 102 and the other process 104, respectively, can be any type of inter-process communication, such as a message passed from one process to another, a semaphore, or information passed through shared memory, to name a few examples. Persons skilled in the art will know other ways of passing information from one process to another.

Figure 3:
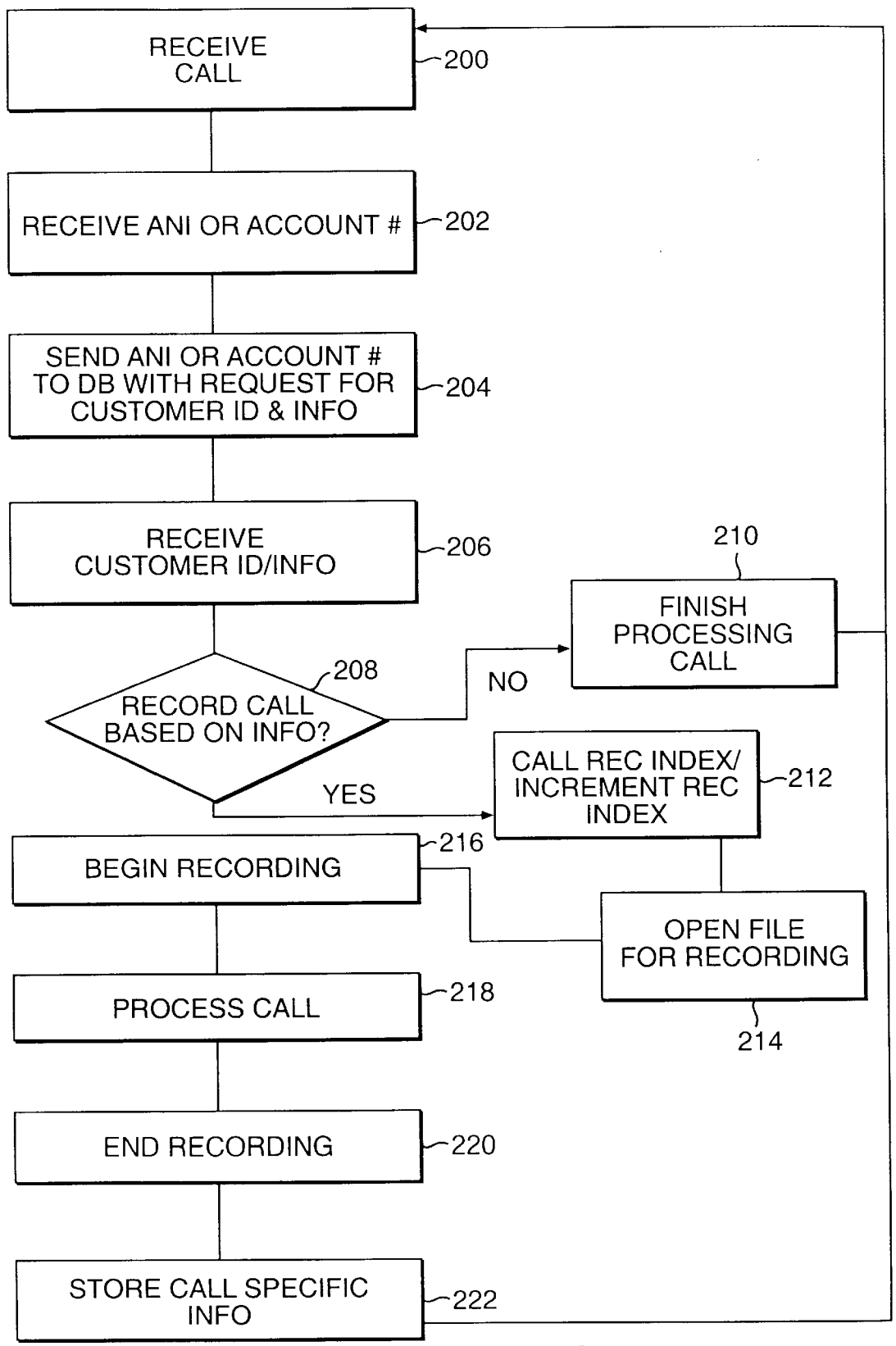
FIG. 3 shows a flow chart of a method for recording a call using the invention.

FIG. 3 shows a flow chart of a method carried out by the application process 100 that records a call. In step 200 the agent receives a call. In step 202 the agent receives automatic number identification (ANI) or customer ID information over the LAN 58. The application process 100 can either use the ANI information itself to decide whether to process the call or it could use the ANI information to access a database stored on another computer or on PC-60, as shown in step 204. Alternatively, the application process can receive, in step 202, any other type of information that it could use to determine whether to record the call.

Figure 7:
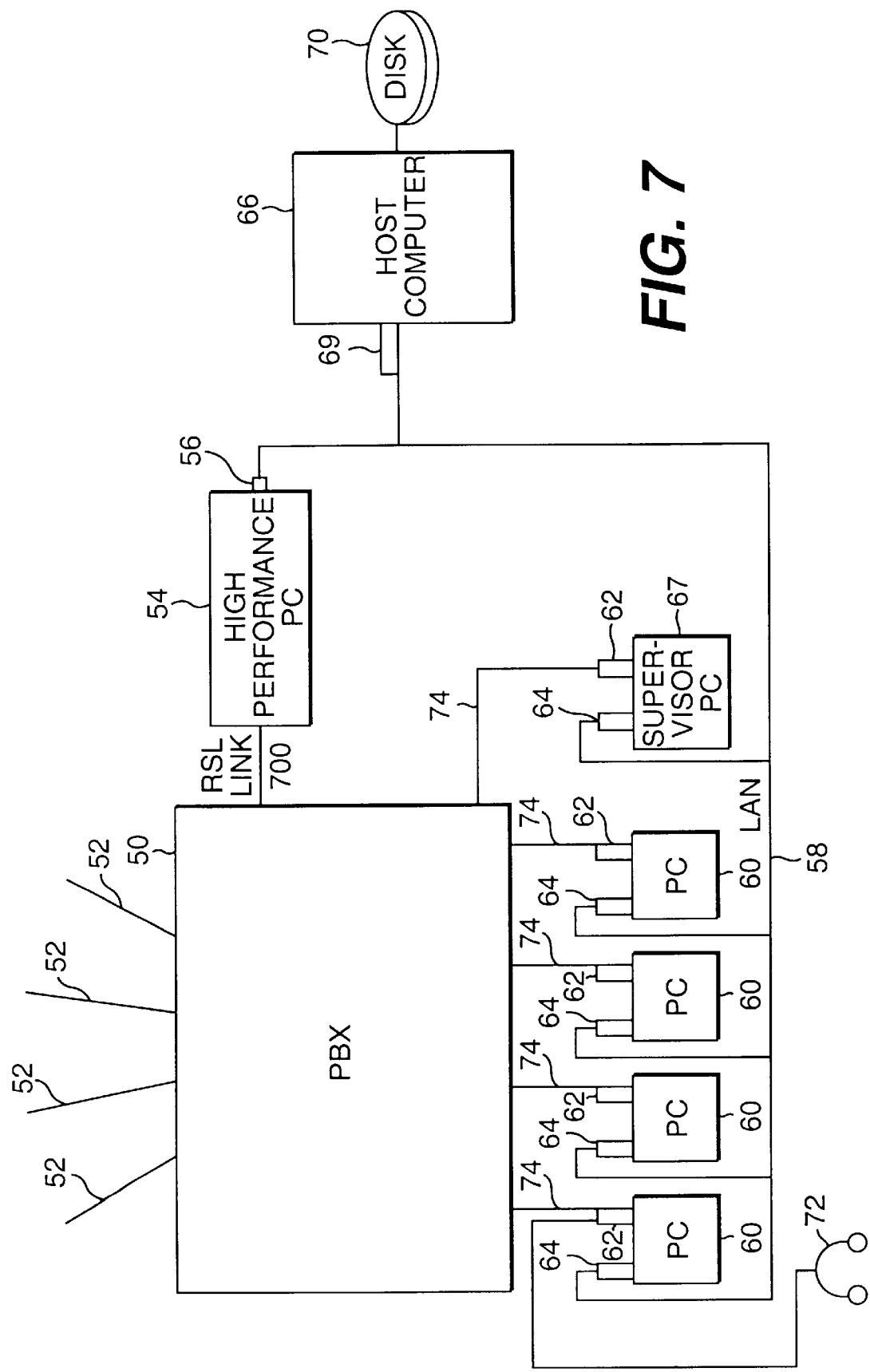
FIG. 7 shows a schematic of a third embodiment of the invention using an RSL link.
Figure 8:
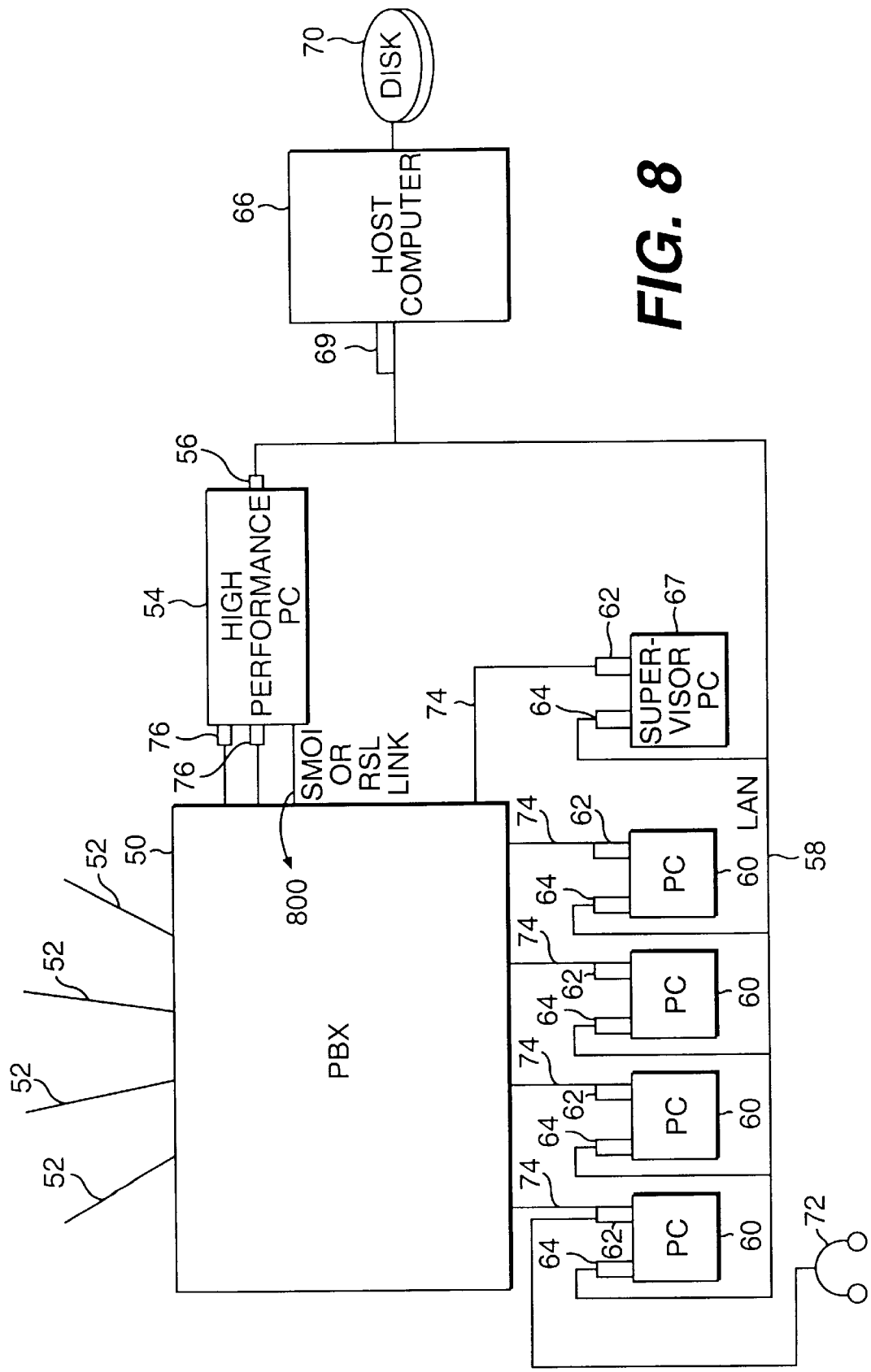
FIG. 8 shows a schematic of a fourth embodiment of the invention.

This information could have been collected from processes running on PC-54 and passed to process 100 via the LAN as part of the answer processing. In one embodiment, the reason for the call is collected via touch tones in process 110 as part of a dialogue with the customer. This "Reason" information is then used as criteria for starting recording. Process 110 in FIG. 2 may perform various call handling functions in various embodiments. For instance, process 110 may control telephony boards 76 to collect DTMF tones or play stored prompts. Process 110 may receive and send call progress and call processing information to and from a telephone switch over a request and status link 700 shown in FIG. 7. Process 110 may collect call related information via a small message desk interface (SMDI) line 800 as shown in FIG. 8. In addition to these embodiments, process 110 may interact with other equipment such as VRU's, host computers, etc.

In the embodiment of application process 100 shown in FIG. 3, the application process, in step 204, sends the ANI account information to a database, with a request for a customer ID and other information. This customer ID could be any type of information about the customer such as the customer's social security number, the customer's address, the amount of money deposited in the customer's account, or the like. The application process 100 receives the customer ID and information in step 206 and uses this information in step 208 to decide whether to record the call. The decision made in step 208 could be made in a number of ways. For example, if the customer ID were the amount of money stored by the customer in its bank account, the step 208 could decide whether to record the call based on a numerical cut off. If the customer had less then a certain number of dollars stored in his bank account, then the call would not be recorded. The reason for this decision might be, for example, that the cost of recording and maintaining a recorded call would out-weigh the cost of an expected error made by the bank with respect to a customer account having a small amount deposited. If the application process 100 decides not to record the call, it proceeds to step 210. In this step the agent finishes processing the call. The application process 100 then returns to step 200 and receives a new call. If however, the application process 100 decides that it will record a call, it proceeds to step 212. In step 212, the application process creates a file name for the job where the recorded telephone conversation will be stored. In this embodiment, file names are simply based on an a numerical index which is incremented for each call that is recorded. Other file name formations could be used. For example, the file name could contain the name of the customer. In the embodiment shown in FIG. 3, the file name consists of the letter "A" followed by the incremented numerical index followed by the suffix ".vox". Once the call record index is updated in step 212 the file is open for recording in step 214. The application process 100 then begins recording by sending a begin record instruction to the board 62. The application process then proceeds to step 218, during which the agent processes the call. This step is essentially the same as step 210. In both steps 210 and 218, the application process 100 will perform various functions depending on the specific application used by the agent. For example, if the call relates to a request by a customer to make changes to his bank account, the application process will cause those changes to be made. Once the agent has finished processing the call, the application process proceeds to step 220, in which it ends recording by sending an end record instruction to the board 62. Between steps 216 and 220, all voice communication between the agent and the customer was recorded and stored in the file opened in step 214. After the recording has been ended in step 220, the application process in step 222 adds whatever useful information is desired to a database entry associated with this recorded transaction. For example, the information might be the date, the time, a brief description of the call, by type, customer name, ID number, phone number, or account number. For example, if the call was a request for a wire transfer the type information might be an indication that the call was a request of a wire transfer. This information is added to the database of call transaction information in step 222, the voice file name is added to the database entry. The storage location of the file may also be stored in the database. This is used to keep track of the file when it is archived or moved to central storage. The file is closed, and the application process returns to step 200 so that it can receive another call.

Figure 4:
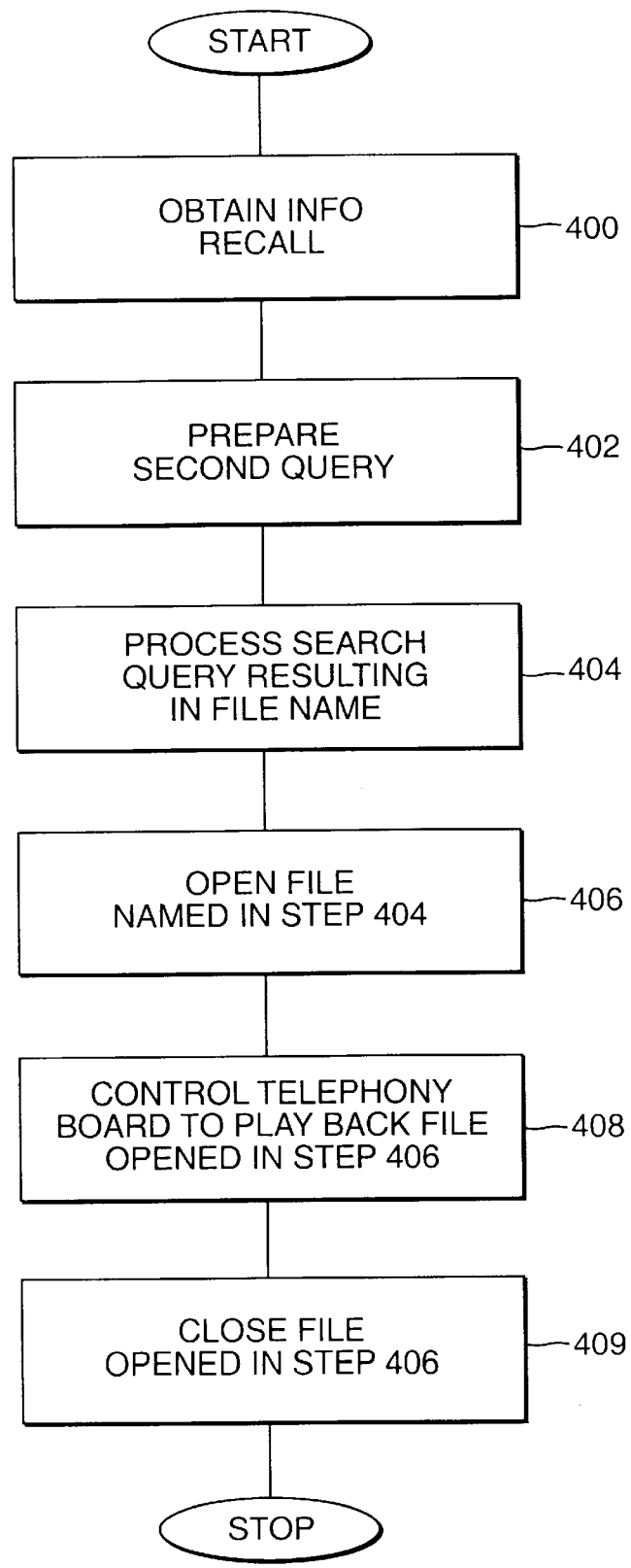
FIG. 4 shows a flow chart of a method for retrieving and playing back a call.

FIG. 4 shows a method of retrieving and playing back a recorded telephone conversation using the present invention. This method is run by the application process in the embodiment disclosed in FIG. 1. In step 400 the application process 100 obtains information about the call desired to be played back. This information could include the date and time the call took place, or information about the subject matter of the call such as the name of the customer who participated in the call or the type of the call. The application process 100 then uses this information to formulate a search query to search for the file where the recorded conversation is stored. The search query uses existing techniques to formulate keys to search a database of all recorded calls. That search is performed in step 404 and results in one or more file names being obtained by the application process 100. The application process 100 then uses the file name and file storage location to open the file in step 406. The opened file is then played back in step 408 by sending a play back instruction to the board 62. In step 409, the file which was opened in step 406 is closed.

Figure 5:
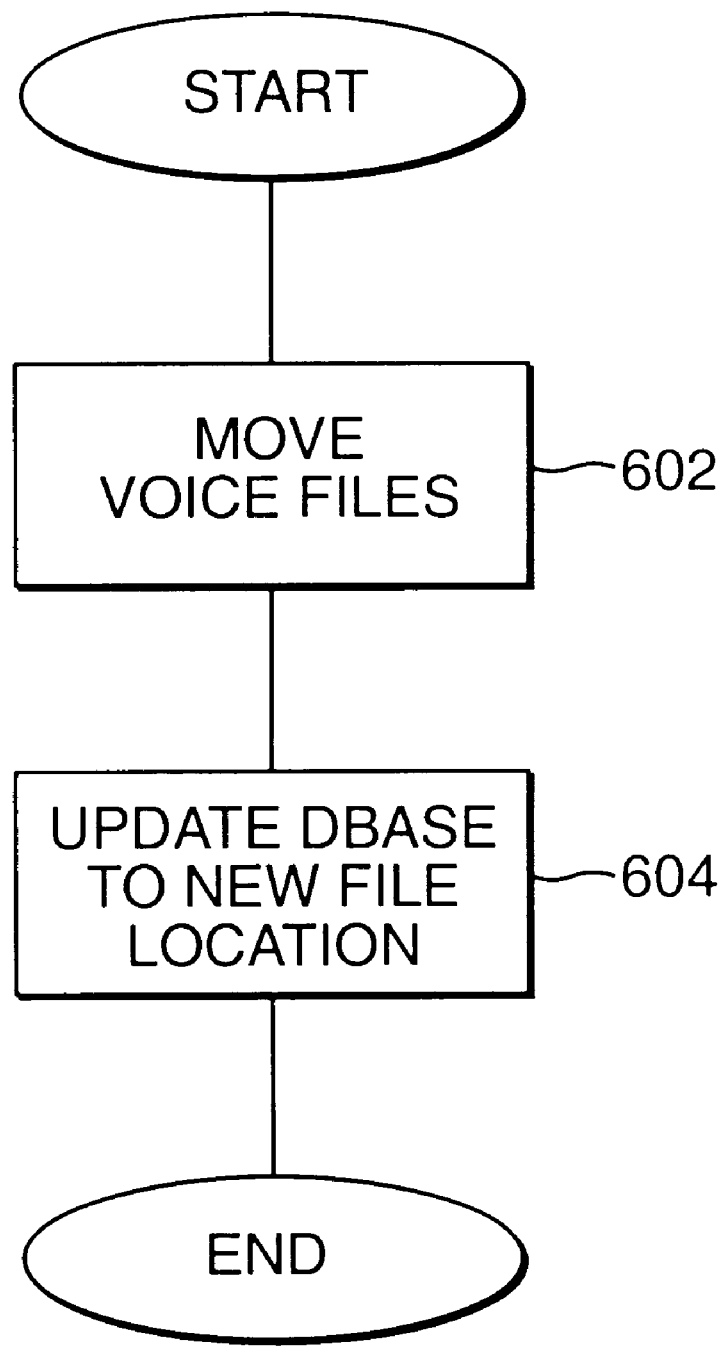
FIG. 5 shows a flow chart describing the archive process

FIG. 5 describes the archiving of voice files. In step 602 files are moved off the workstation hard disks to a central storage device such as disk 70 shown in FIG. 1. The database contains a field which holds the file's location. In step 604, this field is updated to reflect the current location of the file after archive. In practice, the file may be moved several times to less accessible and less costly media as the need for retrieval of the voice file decreases.

Figure 6:
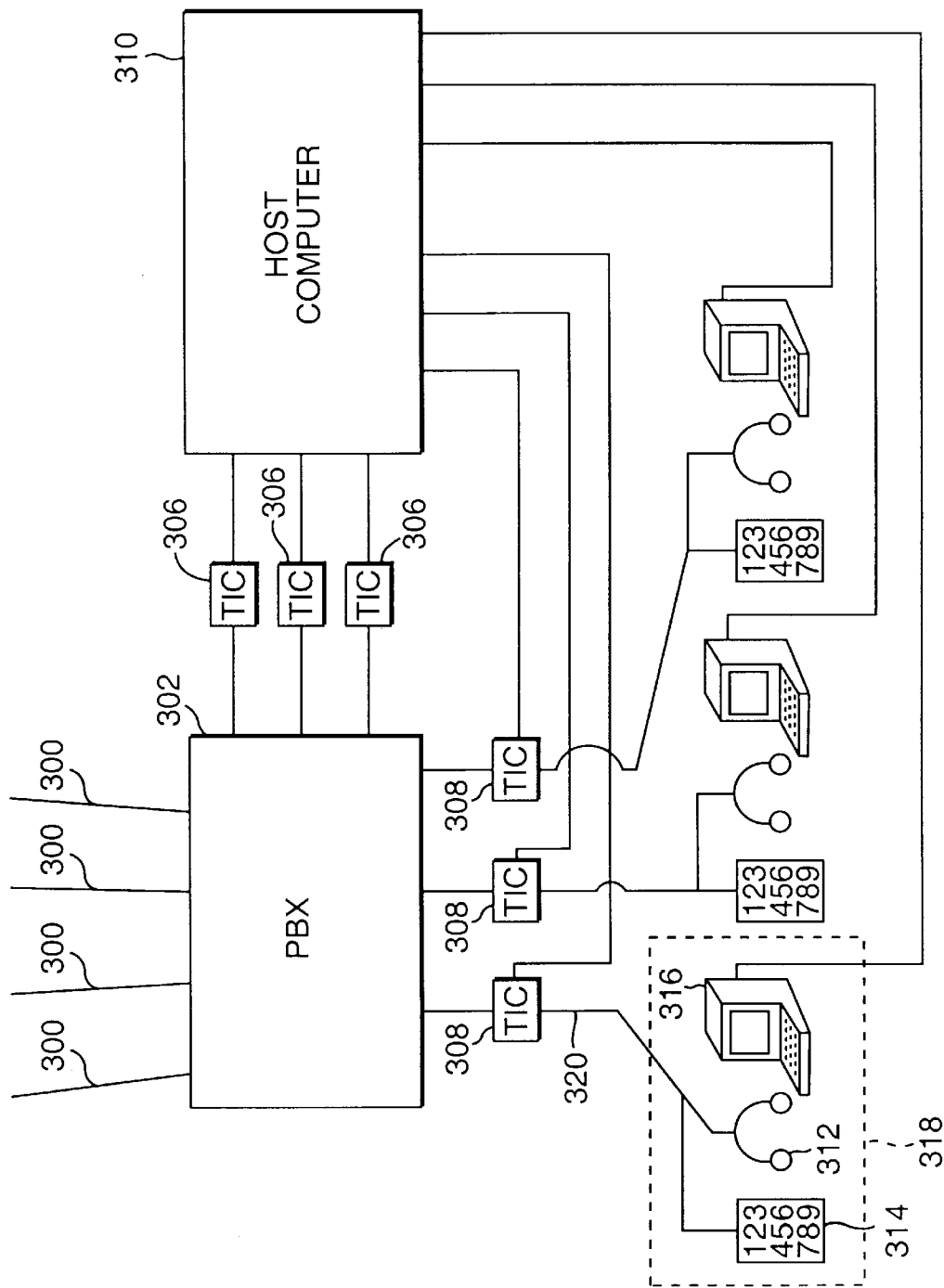
FIG. 6 shows a schematic of a second embodiment of the invention.

FIG. 6 shows a second embodiment of the invention, wherein a centralized multi-user computer is used. In this embodiment, there are a number of agent stations 318 each having a terminal 316, a keypad 314, and a headset 312 including a voice receiver and transmitter. Each headset 312 and keypad 314 is connected to a telephony device or board 308 through which the agent receives and makes telephone calls. The multi-user computer 310 also controls a number of boards 308, which are the same as the board in 62 shown in FIG. 1. These boards 308 are capable of recording calls directly to files on the multi-user computer 310. Like the board 62 in FIG. 1, these boards 308 include driver software that allows processes running on the host computer 310 to control the board to begin recording, end recording, and place the recorded telephone conversation at a specific location of the multi-user computer 310. The internal software architecture of the embodiment shown in FIG. 6 is the same as in FIG. 2, except that there is no LAN 58. Instead, the application process can only communicate with the operating system 102 of the host computer 310 or other processes 104 running on the host computer 310. The methods of the operation of the application process 100 that would run on multi-user computer 310 could also be the same as in FIGS. 3 and 4. Persons having ordinary skill in the art would also know other ways of implementing the claimed invention using other embodiments.

Still in accordance with the invention, the embodiment of FIG. 6 could be modified to include an RSL Link between the PBX and the host computer 310. Alternatively, one could use a SMDI connected between the PBX and the host computer 310.

Figure 9:
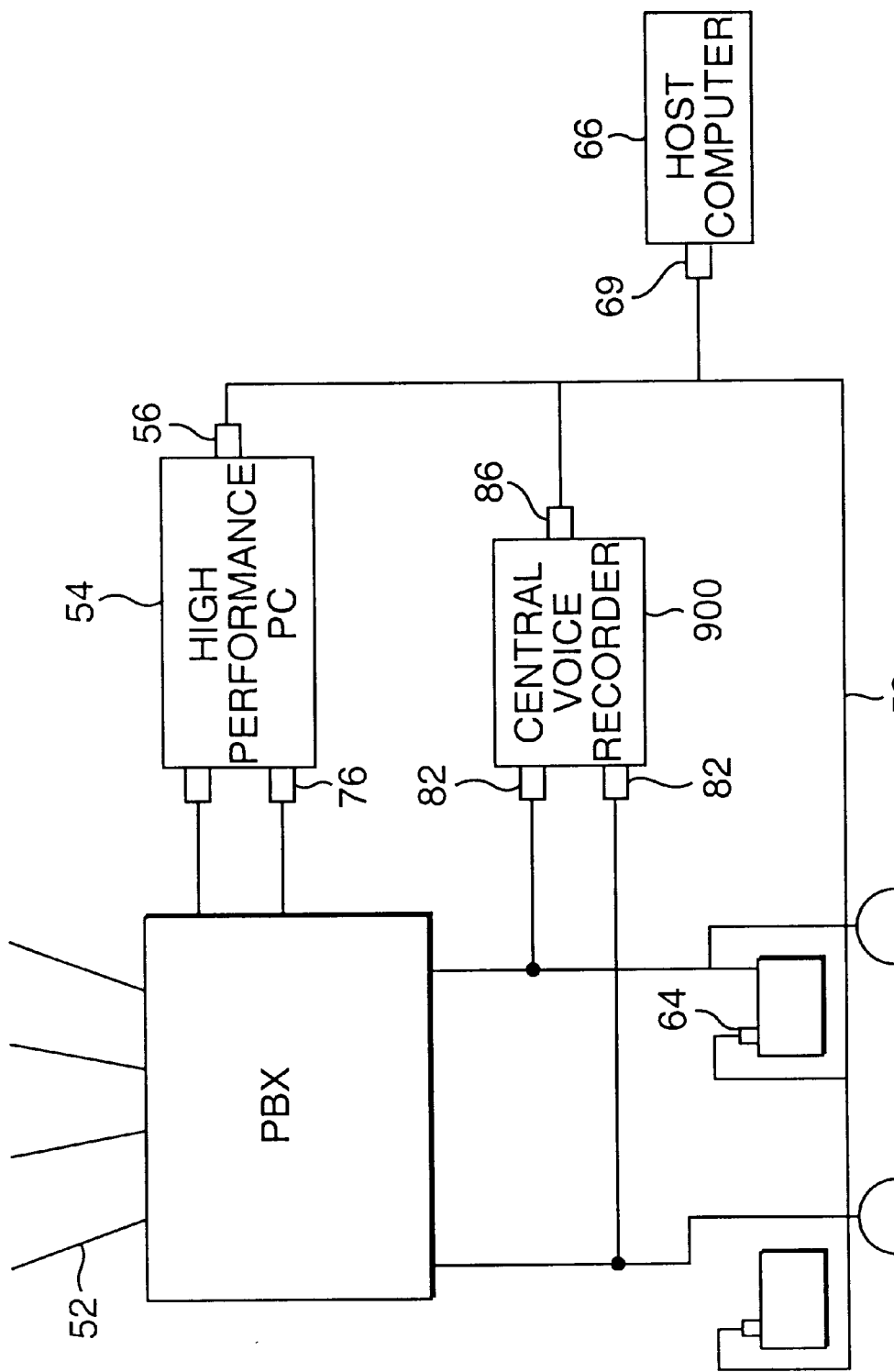
FIG. 9 shows a schematic of an embodiment of the invention used in connection with a central voice recorder.

In a different embodiment of the invention, shown in FIG. 9, voice recording is done in a centralized device, the central voice recorder 900. This device has TIC boards 82 and a networking board 86. This device acts to begin recording and end recording in response to messages sent from processes on devices across LAN 58. So, for instance, Step 216 of FIG. 3 would operate TIC 82 on centralized recording device 900 by messages across the LAN to remote process 120.

Figure 10:
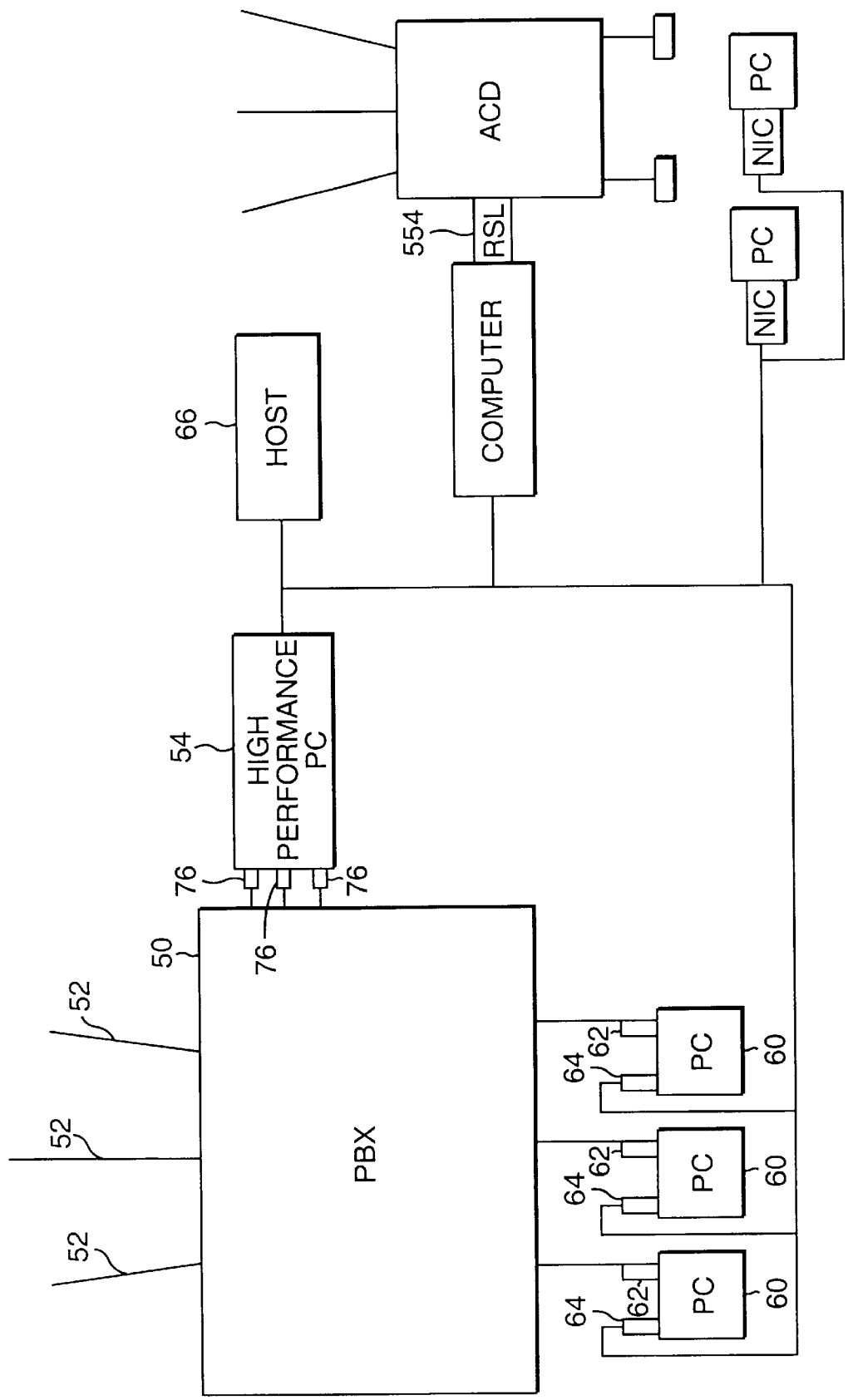
FIG. 10 shows a schematic of an embodiment of the invention comprising multiple ACD's and including an ACD employing an RSL, and shows the hardware connections between the components of the system.

FIG. 10 shows another embodiment of this invention using a Request and Status Link (RSL). In this embodiment, each telephony board 62 is controlled by a running computer program in the computer 60, as discussed above with the other embodiments of the invention. However, in the embodiment shown in FIG. 10, the information for determining whether to record a call and for timing of the recording comes from the RSL 554. The RSL embodiment can be used with distributed or centralized computer control of agent stations and/or hardware.

In addition, the invention can be implemented using a Small Message Desk Interface (SMDI). These interfaces, which link a switching system or PBX with a computer, such as PC 60 in FIG. 1, provide, via a simple connection such as an RS232 connection, much information about a call, such as direct inward dial extension. Thus, for example a stored voice recording could include a record of the extension number dialed by the caller. This is useful in the situation where a user of the present invention places a number of advertisements in a number of different magazines, each advertisement listing a different extension number for interested readers to use when placing a call. By recording the extension number, the user of the invention will be able to derive information about which magazine was read by the caller, thus potentially providing other information based on the typical readers of that magazine.

What is claimed is:

1. A telephony data recording system, comprising:
   a telephony data distribution system to distribute telephony data and to determine information associated with said telephony data;
   a computer coupled to said telephony data distribution system;
   a storage device coupled to said computer;
   a recording device coupled to said computer and to said telephony data distribution system to receive said telephony data;
   an automatic recording process for automatically retrievably recording said telephony data; and
   an application process executing on said computer to obtain said information and to retrievably store said information,
   wherein said automatic recording process comprises a process for automatically recording the telephony data, or any portion thereof, on the basis of said information, and
   wherein said information comprises caller identification data and said automatic recording process comprises a process for determining whether to record the telephony data, or any portion thereof, in accordance with said caller identification data.

2. A method for recording telephone calls, comprising the steps of:
   (a) distributing a telephone call placed by a caller using a telephone call distribution device;
   (b) obtaining information associated with said telephone call from said telephone call distribution device;
   (c) automatically recording at least a portion of said telephone call as a recorded call at a unique location; and
   (d) storing said recorded call and said information on a storage device,
   (e) prompting said caller for said information;
   (f) accepting said information from the caller; and
   (g) recording at least a portion of the telephone call on the basis of said information.

3. A method for recording telephone calls, comprising the steps of:
   (a) distributing a telephone call placed by a caller using a telephone call distribution device;
   (b) obtaining information associated with said telephone call from said telephone call distribution device;
   (c) automatically recording at least a portion of said telephone call as a recorded call at a unique location; and
   (d) storing said recorded call and said information on a storage device, wherein said obtaining step further comprises the steps of:
      (i) determining said information associated with said telephone call from the telephone call distribution device;
      (ii) storing said information;
      (iii) determining other information associated with said telephone call by:
         (1) conducting an interactive voice response session with the caller; and
         (2) obtaining said other information during the session; and
      (iv) storing said other information.

4. A telephony data recording system, comprising:
   a telephony data distribution system to distribute telephony data and to determine information associated with said telephony data;
   a computer coupled to said telephony data distribution system;
   a storage device coupled to said computer;
   a recording device coupled to said computer and to said telephony data distribution system to receive said telephony data;
   an automatic recording process for automatically retrievably recording said telephony data; and
   an application process executing on said computer to obtain information related to said telephony data and to retrievably store said information, and
   wherein said automatic recording process comprises a process for automatically recording the telephony data, or any portion thereof, on the basis of said information, and
   wherein said information comprises caller identification data and said automatic recording process comprises a process for determining whether to record the telephony data, or any portion thereof, in accordance with said caller identification.

5. A method for recording telephone calls, comprising the steps of:
   (a) distributing a telephone call placed by a caller using a telephone call distribution device;
   (b) determining information associated with said telephone call;
   (c) automatically recording at least a portion of said telephone call as a recorded call;
   (d) storing said recorded call and said information on a storage device;
   (e) prompting the caller for said information;
   (f) accepting said information from the caller as accepted information; and
   (g) recording at least a portion of the telephone call on the basis of said information.

6. A method for recording telephone calls, comprising the steps of:
   (a) distributing a telephone call placed by a caller using a telephone call distribution device;
   (b) determining information associated with said telephone call, wherein said determining step (b) comprises the steps of:
      (i) determining said information associated with said telephone call from the telephone call distribution device;
      (ii) storing said information; and
      (iii) determining other information associated with said telephone call, wherein said determining step (iii) comprises the steps of:
         (1) conducting an interactive voice response session with the caller; and
         (2) obtaining said other information during the session; and
      (iv) storing said other information;
   (c) automatically recording at least a portion of said telephone call as a recorded call; and
   (d) storing said recorded call and said information on a storage device.

* * * * *